United States Patent [19]
Yakou

[11] Patent Number: 5,293,157
[45] Date of Patent: Mar. 8, 1994

[54] WORK CLAMPING METHOD AND APPARATUS USING MULTI-POSITIONAL FINGER MEMBERS

[75] Inventor: Takeshi Yakou, Tokyo, Japan

[73] Assignee: Canon Kabushiki Kaisha, Tokyo, Japan

[21] Appl. No.: 893,144

[22] Filed: Jun. 3, 1992

Related U.S. Application Data

[62] Division of Ser. No. 609,727, Nov. 6, 1990, Pat. No. 5,139,246.

[30] Foreign Application Priority Data

Nov. 8, 1989 [JP] Japan .................................. 1-288619
Oct. 30, 1990 [JP] Japan .................................. 2-290722

[51] Int. Cl.$^5$ ......................... G08B 21/00; B23Q 3/00
[52] U.S. Cl. .................................... 340/674; 269/329; 364/474.17
[58] Field of Search .................. 340/674, 686, 309.15, 340/672; 269/329; 901/46; 414/4; 72/31-34; 73/862.381; 364/474.34, 474.17

[56] References Cited

U.S. PATENT DOCUMENTS

| | | | |
|---|---|---|---|
| 3,661,003 | 5/1972 | Heiberger et al. | 72/32 |
| 4,664,364 | 5/1987 | Lymburner | 269/329 X |
| 4,738,438 | 4/1988 | Horie et al. | 269/329 X |
| 4,852,434 | 8/1989 | Bald | 364/474.02 X |
| 4,863,150 | 9/1989 | Hödl et al. | 269/329 X |

FOREIGN PATENT DOCUMENTS

| | | | |
|---|---|---|---|
| 264078 | 4/1988 | European Pat. Off. | 269/329 |
| 89451 | of 1981 | Japan | 269/28 |

*Primary Examiner*—Thomas Mullen
*Attorney, Agent, or Firm*—Fitzpatrick, Cella, Harper & Scinto

[57] ABSTRACT

A workpiece clamping apparatus for clamping various types of workpieces comprises a pair of finger members adapted to be moved toward and away from each other, a first command position setting device for setting a first command position according to the outer configuration of a workpiece to be clamped, a second command position setting device for setting a second command position closer to the position of the workpiece than the first command position and, a driving device for moving the finger members to the second command position past the first command position. A first clamping force setting device sets the workpiece clamping force to be exerted by the finger members to a first clamping force level during movement of the finger members from the first command position to the second command position, and a second clamping force setting device sets the workpiece clamping force to a second clamping force level which is different from the first clamping force level during the movement of the finger members towards the first command position.

16 Claims, 13 Drawing Sheets

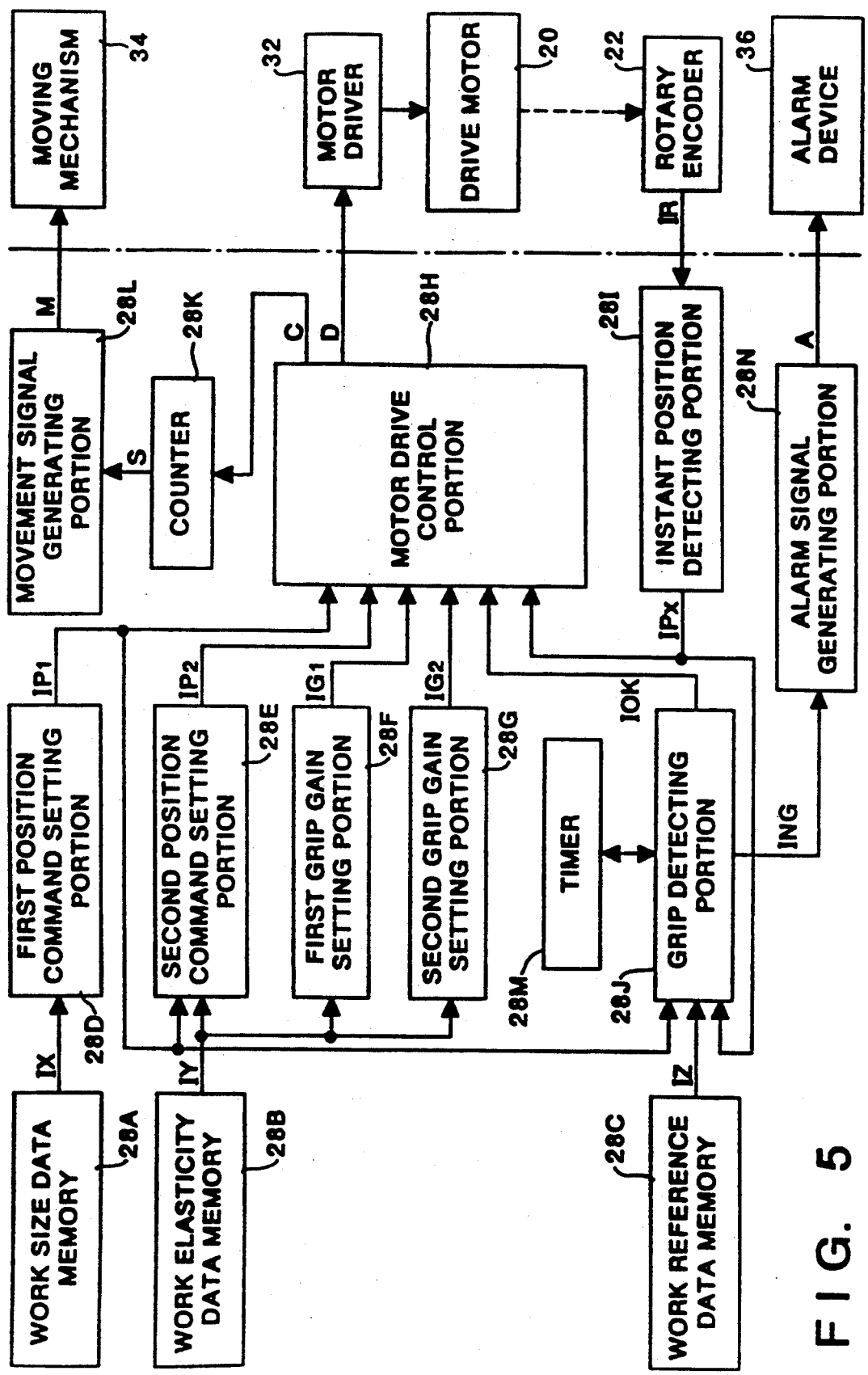
F I G. 5

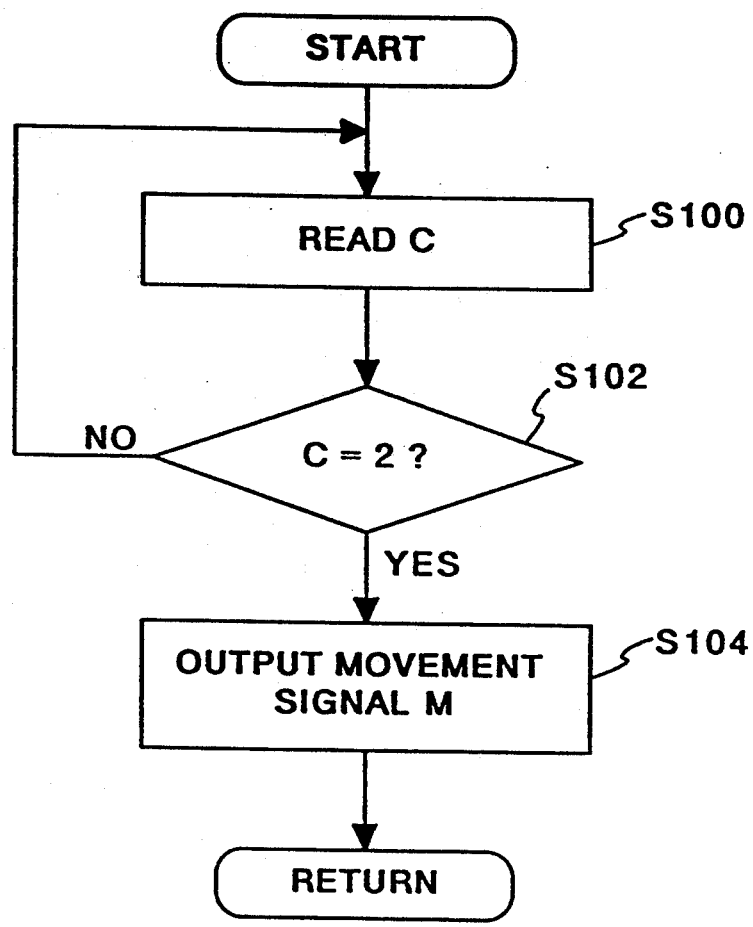
F I G. 7

WORK CLAMPING METHOD AND APPARATUS USING MULTI-POSITIONAL FINGER MEMBERS

This application is a division application of U.S. patent application Ser. No. 07/609,727, filed Nov. 6, 1990 now U.S. Pat. No. 5,139,264, issued Aug. 18, 1992.

BACKGROUND OF THE INVENTION

1. Field of the Invention

The present invention relates to a work, or workpiece, clamping apparatus for clamping a work by a pair of fingers.

2. Description of the Related Arts

A work clamping apparatus has been known in which a work is clamped by a pair of fingers. In general, this type of clamping apparatus employs a sensing system incorporating a sensor such as a limit switch, an optical fiber, a proximity switch or the like capable of sensing the state of clamping of the work.

A problem, however, is encountered when this type of sensing system is applied to general-purpose fingers such as those mounted on an NC machine. Such general-purpose fingers are broadly used since they ar designed to be adaptable to a variety of types of works or parts. Since these fingers engage with various works in a variety of postures and positions, sensing of the state of the clamp may fail according to the position of the clamp.

More specifically, when a cylindrical first work b is clamped by fingers a as shown in FIG. 1A, state of clamp can be sensed through a sensor c regardless of the size of the cylindrical work b because the sensor c always opposes a part of the cylindrical work b. However, when a second work d having a stepped portion is clamped by the fingers a as shown in FIG. 1B, no portion of the work d opposes the sensor c, so that the sensor cannot sense the state of the clamp. In consequence, another set of clamping fingers with a sensor specifically set for the detection of the work d has to be used. Thus, the use of general-purpose fingers, which inherently have wide adaptability to a variety of types of works, is undesirably limited due to difficulty in sensing such a variety of types of works.

SUMMARY OF THE INVENTION

The present invention has been accomplished to overcome the above-described problems of the prior art.

Accordingly, an object of the present invention is to provide a work clamping apparatus which employs conventional clamping fingers and which can correctly sense the state of the clamp by fingers without requiring modification of the clamping fingers and without necessitating any sensor.

Another object of the present invention is to provide a work clamping apparatus employing a novel function of drive and control of clamping fingers so that the state of clamping can be sensed without the aid of any sensor.

Still another object of the present invention is to provide a work clamping apparatus in which the clamping force exerted on the work by fingers can be suitably changed in accordance with the position of the work, thus ensuring high reliability and safety of the clamp.

A further object of the present invention is to provide a work clamping apparatus which is improved to accurately perform clamping action and sense a clamping state in accordance with work size information and/or work elasticity information.

According to a first aspect of the present invention, there is provided a work clamping apparatus comprising: a pair of finger members adapted to be moved toward and away from each other; first position setting means for setting a first position according to the outer configuration of a work to be clamped; second position setting means for setting a second position closer to the position of the work than the first position; driving means for moving the finger members to the second position past the first position; first clamping force setting means for setting the work clamping force to be exerted by the finger members to a first clamping force level when the finger members during movement of the fingers from the first position to the second position; and second clamping force setting means for setting the work clamping force to a second clamping force level which is different from the first clamping force level during movement of the finger members towards the first position.

According to a second aspect of the invention, the work clamping apparatus further comprises: clamp detecting means for detecting whether the work is being clamped by the finger members during movement of the finger members from the first position to the second position.

According to a third aspect of the present invention, the work clamping apparatus further comprises alarming means for producing an alarm signal in response to detection of a non-clamping state of the finger members.

According to a fourth aspect of the present invention, the first position setting means sets the first position in accordance with work size data concerning the size of the work.

According to a fifth aspect of the present invention, the second position setting means sets the second position in accordance with work elasticity data concerning the elasticity of the work.

According to a sixth aspect of the present invention, the second position setting means sets the second position near the first position when the work to be clamped has a comparatively small elasticity and to a location remote from the first position when the work to be clamped has a comparatively large elasticity.

According to a seventh aspect of the present invention, the first clamping force setting means sets the first clamping force in accordance with a comparatively small clamp gain.

According to an eighth aspect of the present invention, the second clamping force setting means sets the second clamping force in accordance with a comparatively large clamp gain.

According to a ninth aspect of the present invention, a work clamping apparatus has first clamping force setting means which sets, in the operation for sensing the state of clamping, the first clamping force to a comparatively low level in accordance with a comparatively small clamping gain and, in the operation for actually clamping the work, sets the first clamping, force to a comparatively high level in accordance with a comparatively large clamping gain.

According to a tenth aspect of the present invention, the clamp detecting means has a reference value peculiar to the work to be clamped and determines that the work is not clamped on the condition that the reference value is exceeded by the amount of travel of the finger members from the first position to the second position.

According to an eleventh aspect of the present invention, the clamp detecting means determines that the work has been clamped on the condition that the reference value is not exceeded by the amount of travel of the finger members after an elapse of a predetermined time.

According to a twelfth aspect of the present invention, the moving means is operative to return the finger members to the first position after confirmation of the clamping of the work by the finger members.

According to a thirteenth aspect of the present invention, the moving means causes the finger members to move again towards the second position after the finger members are returned to the first position.

According to a fourteenth aspect of the present invention, the movement of the finger members from the first position to the second position is conducted with a first clamping force set by the first clamping force setting means during the operation for detecting the state of clamping and with a second clamping force set by the second clamping force setting means during the operation for actually clamping the work.

According to a first aspect of the method of the invention for detecting the state of clamping of a work, there is provided a method which comprises: a first step for moving the finger members relative to each other in accordance with the configuration of the work to a first position where the finger members contact the work with a small force; a second step for further moving, with a reduced force, the finger members to a second position which is closer to the work than the first position; a third step for detecting whether the further movement of the finger members in the second step has been actually effected; and a fourth step for determining the state of clamping of the work by judging that the work is in position for actual clamping when no substantial further movement of the finger members is detected in the third step and that the work is absent in the position for clamping when a substantial further movement of the finger members is detected in the third step.

According to a second aspect of the method of the present invention, a fifth step is executed for setting off an alarm when the absence of the work is detected in the fourth step.

According to a third aspect of the method of the present invention, a sixth step is executed for returning the finger members to the first position when the presence of the work in the position for clamping is detected in the fourth step.

According to a fourth aspect of the method of the present invention, a seventh step for causing the finger members to clamp the work with a greater force is executed after execution of the sixth step.

According to a fifth aspect of the method of the present invention, the determination in the fourth step is conducted by acknowledging occurrence of the substantial further movement of the finger members upon detection of the movement of the finger members from the first position toward the second position in an amount exceeding a predetermined reference value peculiar to the work to be clamped.

According to a sixth aspect of the method of the present invention, the determination in the fourth step is conducted by acknowledging non-occurrence of the substantial further movement of the finger members upon detecting that the amount of movement of the finger members from the first position toward the second position effected in a predetermined time is not greater than a reference value peculiar to the work to be clamped.

According to a first aspect of an apparatus of the invention for confirming clamping of a work, the apparatus comprises: a pair of finger members for clamping the work; memory means for storing data peculiar to the work to be clamped; first position setting means for setting, in accordance with data derived from the memory means, a first position of the finger members where the finger members contact the work with a small force; second position setting means for setting, in accordance with the data derived from the memory means, second position of the finger members closer than the first position to the portions of the work to be engaged by the finger members; and detecting means for detecting the absence or presence of the work upon sensing occurrence or non-occurrence of movement of the finger members from the first position to the second position.

According to a second aspect of the apparatus of the present invention for confirming clamping of a work, the apparatus further comprises driving means for driving the finger members towards the second position set by the second position setting means past the first position set by the first position setting means.

According to a third aspect of the apparatus of the invention for confirming clamping of a work, the apparatus further comprises reference value memory means for storing a reference value which is set for each type of work to be clamped and which is used in the detection of occurrence or non-occurrence of movement of the finger members from the first position to the second position.

According to a fourth aspect of the apparatus of the invention for confirming clamping of a work, the detecting means includes: measuring means for measuring the amount of movement of the finger members from the first position to the second position; and comparator means for comparing the movement amount data produced by the measuring means with the reference value derived from the reference value memory means.

According to a fifth aspect of the apparatus of the present invention for confirming clamping of a work, the detecting means determines that the work to be clamped is absent when the result of the comparison performed by the comparator means has proved that the measured amount of movement is greater than the reference value.

According to a sixth aspect of the apparatus of the present invention for confirming clamping of a work, the detecting means further includes: time measuring means for measuring the time from the commencement of the movement of the finger members from the first position to the second position.

According to a seventh aspect of the apparatus of the present invention for confirming clamping of a work, the detecting means determines that the work to be clamped is present, when the result of the comparison performed by the comparator means has proved that the amount of movement is smaller than the reference value after the time measuring means has measured an elapse of a predetermined time.

Thus, according to the present invention, whether the work is in the position for clamping can be detected in advance to the actual clamping, without using any sensor which is necessary in the known clamping apparatus of the type described. Namely, in the present invention, the finger members brought into contact with the work are further urged with a reduced force and occurrence or nonoccurrence of a substantial further movement corresponding to the elasticity of the work is detected. When no substantial further movement is detected, it is judged that the work is present in the position for clamping, whereas, when a substantial further movement is detected, it is judged that the work to be clamped is absent.

In addition, the finger members can be controlled to the first position with a high degree of positional precision because the movement of the finger members to the first position is effected with the second clamping force which is comparatively large. Furthermore, the movement of the finger members from the first position toward the second position for the purpose of confirming the state of clamping is conducted with a first clamping gain which is comparatively small, thus eliminating any risk of damaging of the work during the operation for confirming the state of clamping.

In the present invention, the second command used in the operation for confirming the state of clamping is varied in accordance with the elasticity data concerning the elasticity of the work to be clamped. More specifically, the second position is set to a location nearer to the first position when the elasticity of the work is comparatively small and, when the work has a comparatively large elasticity, the second position is set to a location comparatively remote from the first position. This enables the driving means to operate with optimum clamping force corresponding to the elasticity of the work.

According to the invention, the reference value used as a criterion for the confirmation of state of clamping is set for each type of work to be clamped. More specifically, the reference value is set to be small when the elasticity is small and is set to be large when the elasticity is large. Therefore, the presence or absence of the work is determined immediately when the work is hard and rigid, whereas, when the work is elastic and soft, the presence or absence of the work is determined without fail, taking into account the amount of possible plastic deformation of the work.

Furthermore, in the present invention, the safe clamping state is confirmed when the actual amount of movement of the finger members is smaller than the reference value and that the predetermined time has passed since the start of the movement of the fingers from the first position for confirming the state of clamp. Thus, whether the work is in a state for safe clamping is determined taking into account the possible delay of a response of the transmission force. It is therefore possible to confirm the safe state of clamping without any error which may otherwise be caused by the delay of the response in the force transmission system.

In addition, in the present invention, the actual clamping operation is not commenced immediately after the confirmation of safe clamping of the work but is conducted after resetting the finger members to the first position and then moving again the finger members towards the second position. Thus, the actual clamping is started when the finger members have been brought again to the first position where they touch the work. Thereafter, the clamping force is gradually increased by a progressive movement of the finger members towards the second position, so that the work can be clamped safely without any damage.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a block diagram showing the construction of a control system of the embodiment of the work clamping apparatus;

FIG. 7 is a flow chart showing a control procedure for generating a movement signal.

DESCRIPTION OF THE PREFERRED EMBODIMENTS

An embodiment of the work clamping apparatus in accordance with the present invention will be described with reference to FIGS. 2 to 7.

Figure 1A:
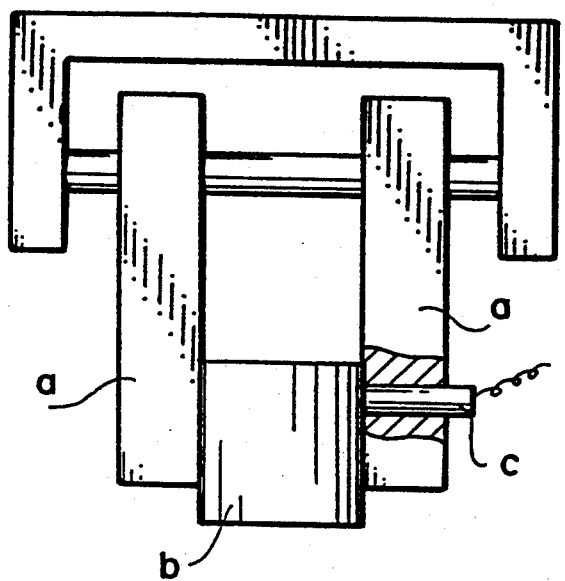
FIGS. 1A and 1B are schematic front elevational views of a conventional work clamping apparatus clamping different types of works.
Figure 1B:
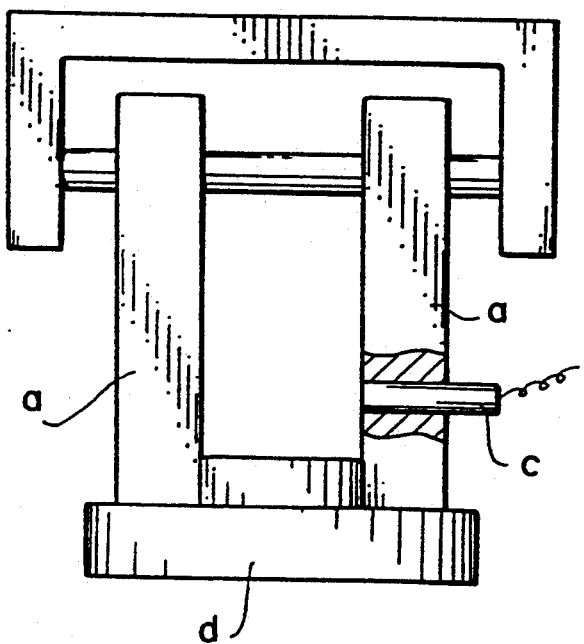
Figure 2:
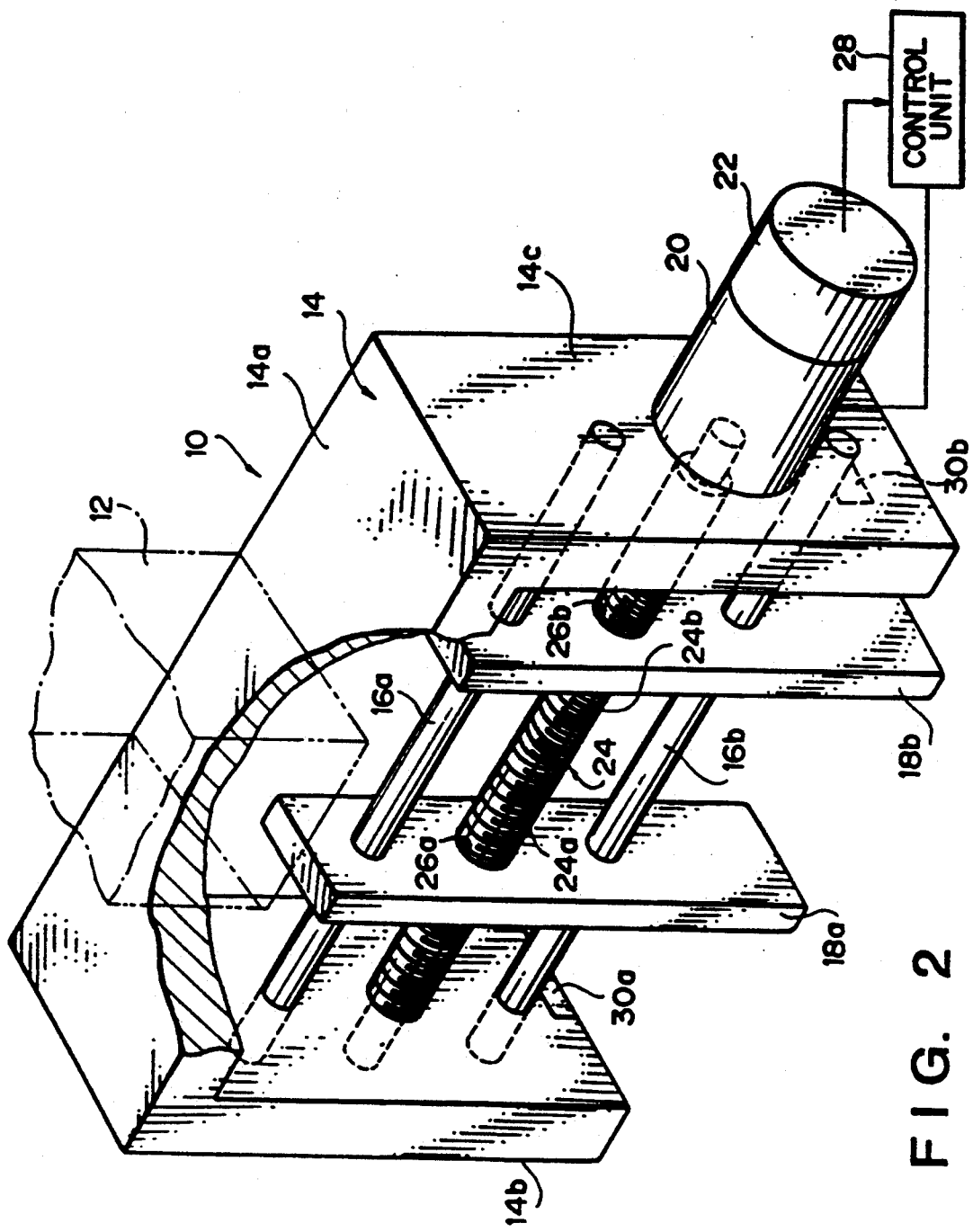
FIG. 2 is a schematic prospective view of an embodiment of the work clamping apparatus in accordance with the present invention.
Figure 3:
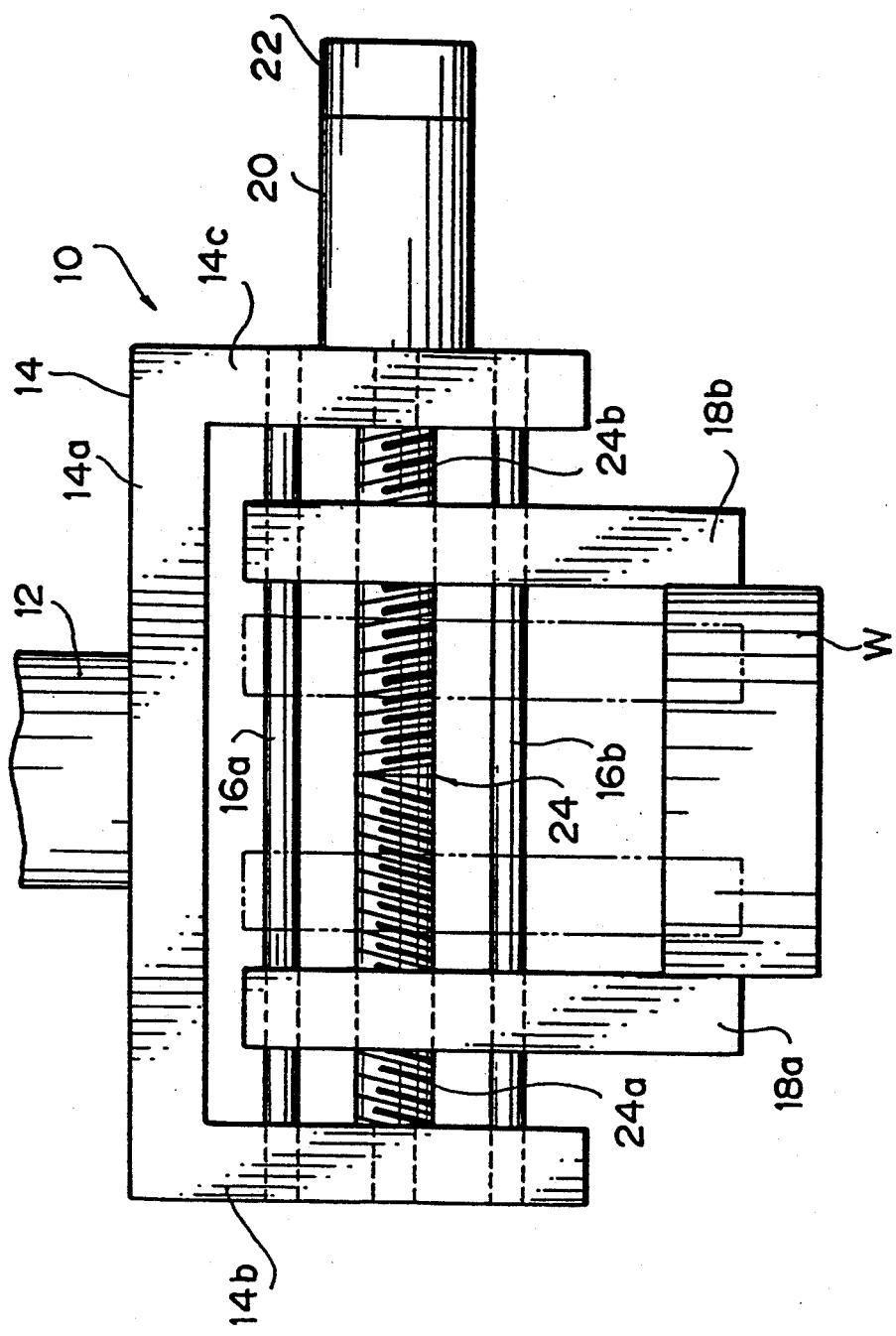
FIG. 3 is a front elevational view of the work clamping apparatus, illustrating a first command position which is a work clamping position and a second command position.

As will be seen from FIG. 2, the embodiment of the work clamping apparatus, generally designated at numeral 10, has a main part 14 which is connected to an arm of an NC machine (not shown). The main part 14 includes an inverse U-shaped bracket which is opened at its lower side. Namely, the main part 14 has a horizontal top plate portion 14a and vertical tabs 14b and 14c depending from the left and right ends of the horizontal top plate portion 14a. A pair of vertically spaced guide rods 16a and 16b are each fixed at both ends to the vertical tabs 14b and 14c so as to extend horizontally in parallel with each other. The clamping apparatus also has a pair of vertically extending finger members 18a and 18b such that they can move along the guide rods 16a and 16b so as to clamp and unclamp a work which is not shown. More specifically, in this embodiment, the arrangement is such that the work (or workpiece) is clamped by being pinched between these finger members 18a and 18b when the members are moved towards each other.

One of the vertical tabs 14c, which is on the right side as viewed in FIG. 2, carries a drive motor 20. In this embodiment, the drive motor 20 is a reversible servo motor which can drive the pair of finger members towards and away from each other. The drive motor 20 is arranged such that its output shaft (not shown) extends horizontally. In order to accurately detect the amount of rotation of the motor output shaft, a rotary encoder 22 is connected to the output shaft of the drive motor 20.

The output shaft of the drive motor is connected to a feed screw 24. The left-half section of the feed screw 24 as viewed in FIG. 2 has a forward screw thread as at 24a, while the right half section has a backward or reverse screw thread as at 24b. The distal end of the feed screw 24, which is on the left side as viewed in FIG. 2, is rotatably supported by the left vertical tab 14b of the main part 14.

The finger member 18a which is on the left side as viewed in FIG. 2 has a threaded bore 26a for screwing engagement with the forward threaded portion 24a of the feed screw 24, while the right finger member 18b has a threaded bore 26b for screwing engagement with the reverse thread portion 24b of the feed screw 24. Thus, the feed screw 24 extends through the left and right finger members 18a and 18b with its forward and reverse thread portions 24a and 24b held in screwing engagement with the threads in the threaded bores 26a and 26b.

Since the left and right finger members 18a and 18b are in screwing engagement with the forward thread portion 24a and the reverse thread portion 24b, respectively, a clockwise rotation of the feed screw 24 causes the finger members 18a and 18b to be driven away from each other so as to unclamp the work. Conversely, a counterclockwise rotation of the feed screw 24 causes the finger members 18a and to be driven toward each other to enable them to pinch or clamp the work therebetween.

Origin sensors 30a and 30b are attached to the inner surfaces of the vertical tabs 14b and 14c. Each of the origin sensors 30a and 30b is adapted to generate an on signal, i.e., an origin signal, when approached by the associated finger member 18a or 18b. In the illustrated embodiment, the arrangement is such that origin signals are generated when both finger members 18a and 18b have been moved to outer ends of their strokes, i.e., when the clamping finger members are fully spaced from each other.

The drive motor 20 is connected to the control unit 28 of the NC machine so that the amount of operation of the drive motor 20 is accurately controlled by the control unit 28. The rotary encoder 22 also is connected to the control unit 28 so as to deliver the result of detection of the amount of operation of the drive motor, i.e., the amount of rotation of the output shaft of the drive motor.

The construction of the control system of this work clamping apparatus will be described with reference to FIG. 5.

As will be seen from FIG. 5, the control unit 28 has a work size data memory 28A for storing data IX concerning dimensions of a variety of types of works, a work elasticity data memory 28B for storing data IY concerning the elasticity of a variety of works, and a work reference data memory 28C for storing reference data IZ for the independent work during clamp confirming operation. The work size data IX is determined in terms of the dimension of the portion of the work to be clamped, i.e., the distance between two points which are to be contacted by the pair of clamping finger members.

The control unit 28 has a first command position setting portion 28D for setting, in accordance with the work size data IX given from the work size data memory 28A, a first position command $P_1$ for the movement of the finger members 18a and 18b, and a second command position setting portion 28E which sets, in accordance with the first command position $P_1$ and the elasticity data derived from the work elasticity data memory 28B, a second command position $P_2$ which is used for enabling sensing of the state of clamping.

The above-mentioned reference value Z is used as a reference for determination as to whether the work is actually clamped between the pair of finger members 18a and 18b. Thus, the reference value Z is determined for each different type of work, as a value which is of a predetermined ratio or proportion to the distance between the first command position $P_1$ and the second command position $P_2$, i.e., at the predetermined ratio to the absolute value of the difference $P_1-P_2$.

The first command position Pl is set to enable the finger members 18a and 18b to make contact with the portions of the work to be clamped with a small contact pressure. On the other hand, the second command position $P_2$ is determined on the basis of the first command position $P_1$, taking into account the elasticity of the work to be clamped. More specifically, when the work to be clamped is so rigid that it exhibits a small deflection or deformation in response to the pressure, the second command position $P_2$ is determined such that the finger members 18a and 18b are set at a spacing which is 99% of the distance between these finger members 18a, 18b in the first command position. Conversely, when the work to be clamped has a large elasticity, i.e., small rigidity, the second command position $P_2$ is determined such that the distance between both finger members 18a and 18b set at this second command position $P_2$ is 80% of the distance between the finger members at the first command position.

The control unit 28 further has a first clamp gain setting portion 28F for setting a first clamp gain which sets, in accordance with the elasticity data from the work elasticity data memory 28B, a comparatively small gain for the control of movement of the clamping fingers from the first command position $P_1$ to the second command position $P_2$ for the sensing of the state of clamp, and also a second clamp gain setting portion 28G which sets a comparatively large gain for the control of movement of the clamping fingers from the first command position $P_1$ to the second command position $P_2$ for the clamping operation. In this embodiment, the first clamp gain used for the sensing of the clamping state is a very small value, e.g., such that 1 mm movement of each finger members 18a and 18b is caused by a very small torque of 0.4 kgcm, whereas the second clamp gain for the clamping operation is determined to be a comparatively large value, e.g., such that the 1 mm movement of each finger member requires a driving torque of 2.0 kgcm.

The first and second command position setting portions 28D, 28E and the first and second clamp gain setting portions 28F, 28G are commonly connected to a motor drive control portion 28H which controls the operation of the drive motor 20. Consequently, first and second command position data $IP_1$ and $IP_2$, as well as the first and second clamp gain data $IG_1$ and $IG_2$, are delivered to the motor drive control portion 28H. To the rotary encoder 22 is connected an instant position detecting portion 28I which detects the instant position Px of the finger members 18a and 18b in accordance with the rotation data IR concerning the amount of rotation of the output shaft of the drive motor 20. The instant position detecting portion 28I is adapted to deliver the instant position data IPx to the motor drive control portion 28H and also to a later-mentioned clamp detecting portion 28J.

The motor drive control portion 28H is adapted for delivering a drive signal D in a predetermined sequence to a motor driver 32, in accordance with the first and second command position data $IP_1$, $IP_2$, first and second clamp gain data $IC_1$, $IG_2$, instant position data IPx derived from the instant position detecting portion 28I, and a later-mentioned clamp confirmation data IOK which is delivered by the clamp detecting portion 28J.

A counter 28K is connected to the motor drive control portion 28H. The motor drive control portion 28H delivers to the counter 28K a count signal C representing the number of driving cycles necessary for driving the finger members from the first command position $P_1$ to the second command position $P_2$. A movement signal generating portion 28L, which is connected to the counter 28K, is adapted to receive a control signal S which is produced by the counter 28K when the count signal C has become "2". Upon receipt of the control signal S from the counter 28K, the movement signal generating portion 28L delivers a movement start signal M to a moving mechanism 34 for moving the arm 12 of the NC machine which is not shown.

To the clamp detecting portion 28J are connected the work reference data memory 28C, the rotary encoder 22, the motor drive control portion 28H and the timer 28M. The clamp detecting portion 28J judges the statement of movement of the finger members 18a, 18b from the first command position $P_1$ to the second command position $P_2$, in accordance with the reference data IZ from the work reference data memory 28C and the instant position data IPx from the rotary encoder 22.

More specifically, when the amount of movement of the finger members from the first to second command positions in a predetermined time T is within a reference value W, the clamp detecting portion 28J confirms safe clamping of the work and delivers the clamp confirmation signal IOK to the motor drive control portion 28H. Conversely, when the amount of movement of the finger members 18a, 18b from the first to second command positions in the above-mentioned time T exceeds the reference value W, the clamp detecting portion 28J decides that the work has not been clamped and delivers a non-clamp signal ING to an alarm signal generating portion 28N.

Since the detection of the clamp performed by the clamp detecting portion 28J is executed on the basis of the detected amount of movement of the finger members 18a and 18b, it is necessary to take a suitable measure for eliminating any undesirable effect which may be produced by the delay of the operation of the mechanical portion of the drive motor 20 and delay of the response involved in the power transmission system including the feed screw 24. In this embodiment, therefore, the routine for confirming the state of clamp is executed after elapse of the time T which is measured by the timer M.

The alarm signal generating portion 28N delivers an alarm signal A to an alarm device 36, upon receipt of the non-clamp signal ING. Although not shown, an alarm lamp and an alarm buzzer of the alarm device 36 operate in response to the alarm signal so as to inform the operator of the non-clamp state of the clamping apparatus both through light and sound.

Figure 6:
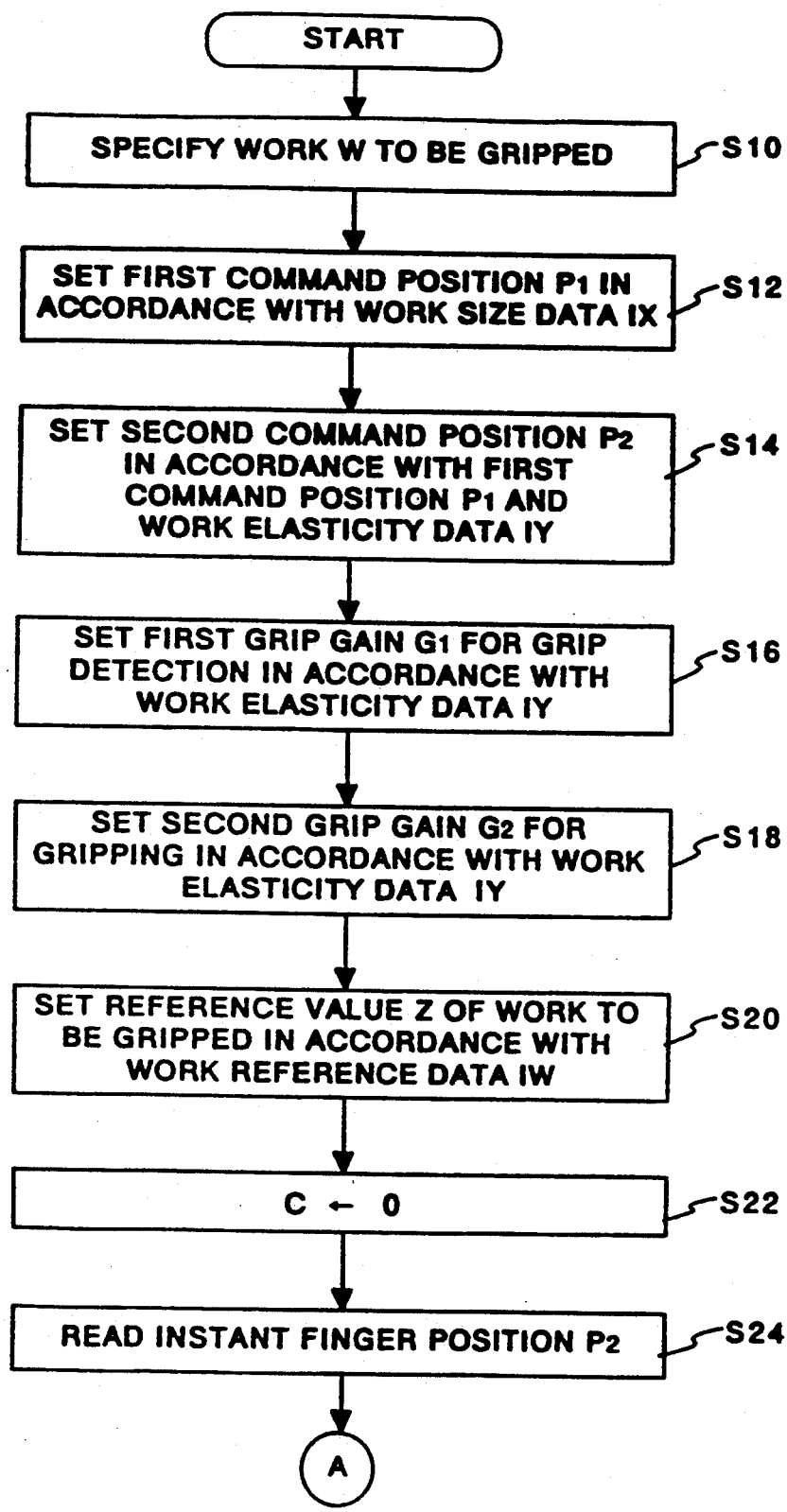
FIGS. 6A–6F are flow charts illustrating the control procedure of the work clamping operation executed by the control system shown in FIG. 5.
Figure 6:
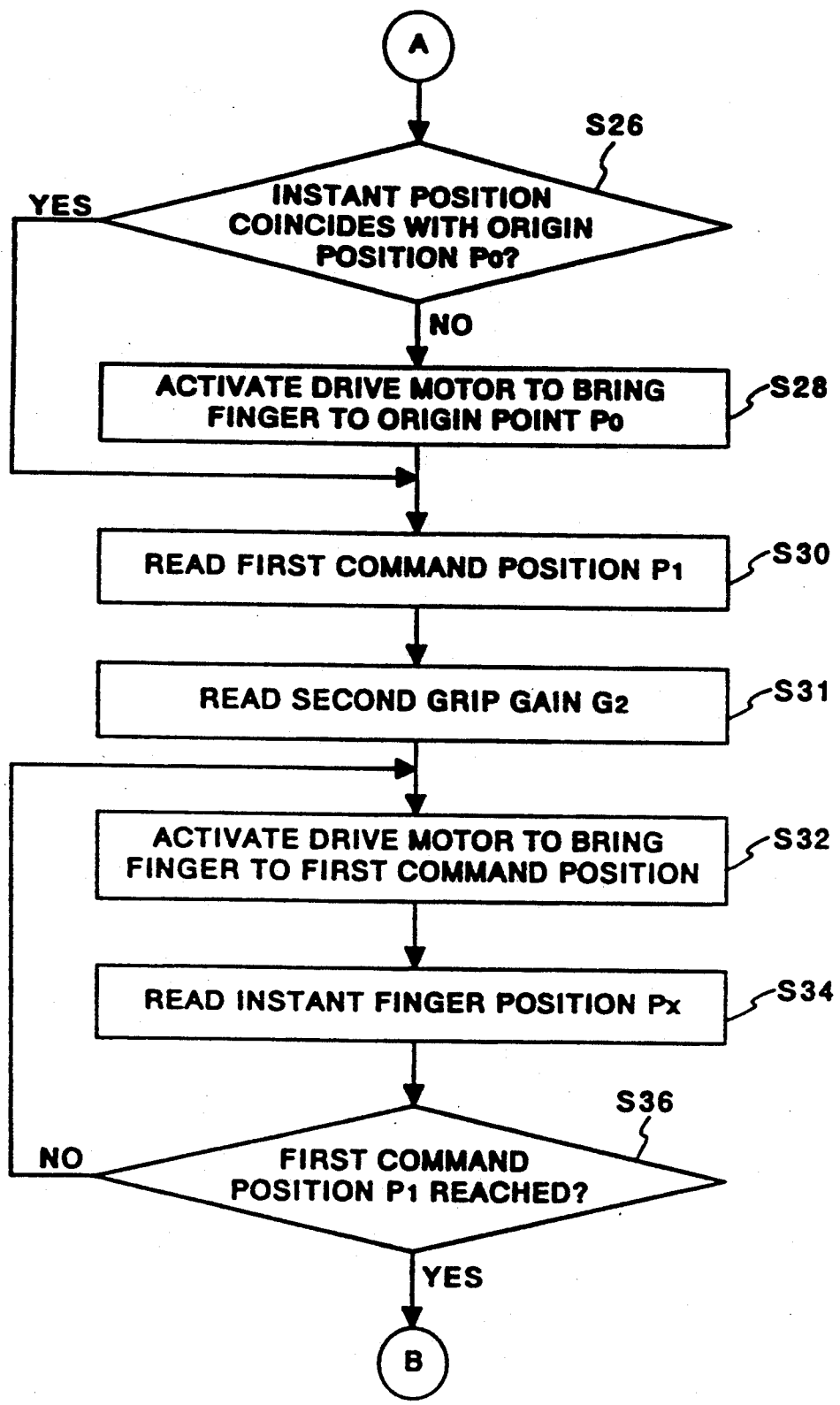
Figure 6C:
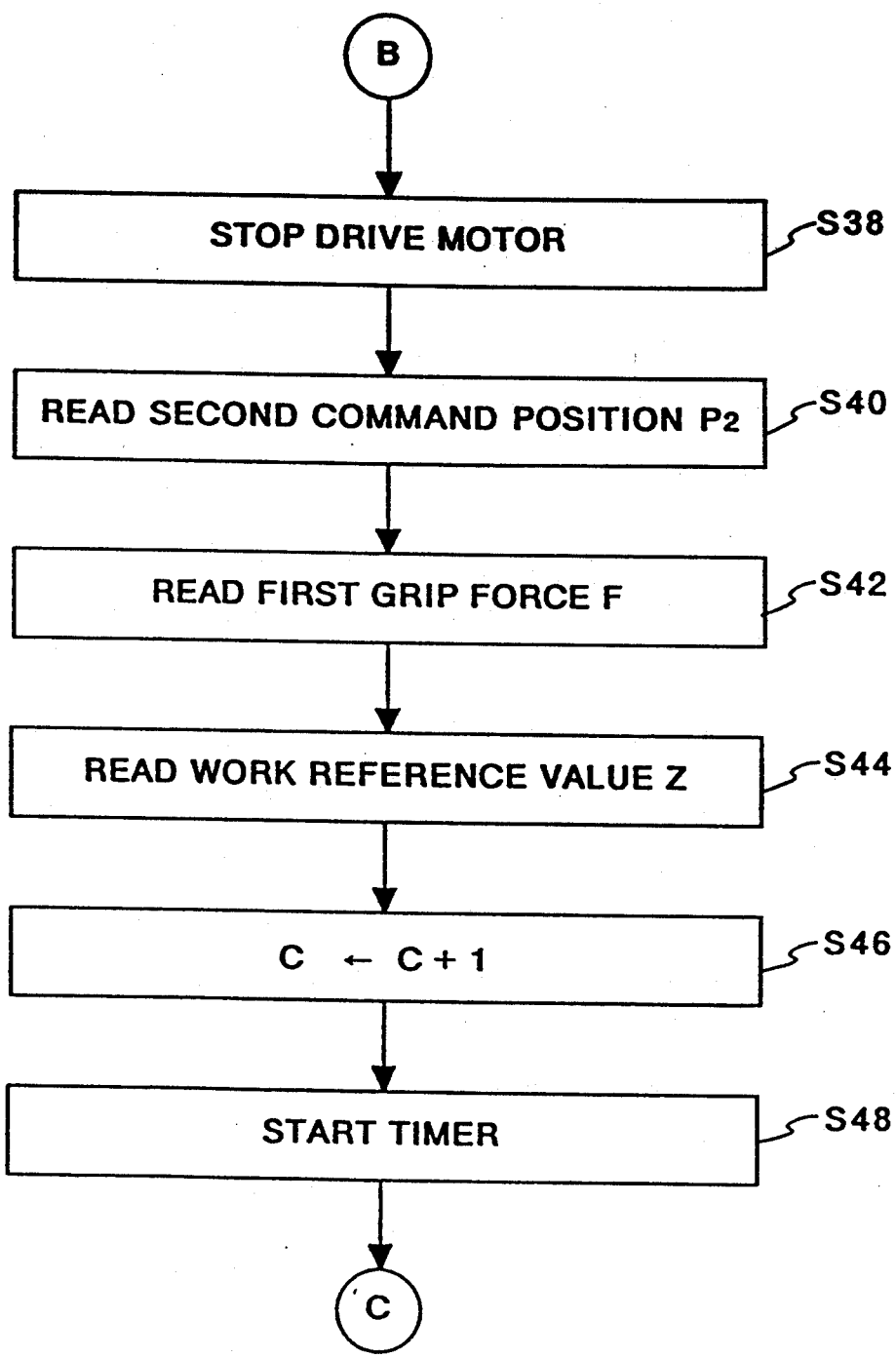
Figure 6:
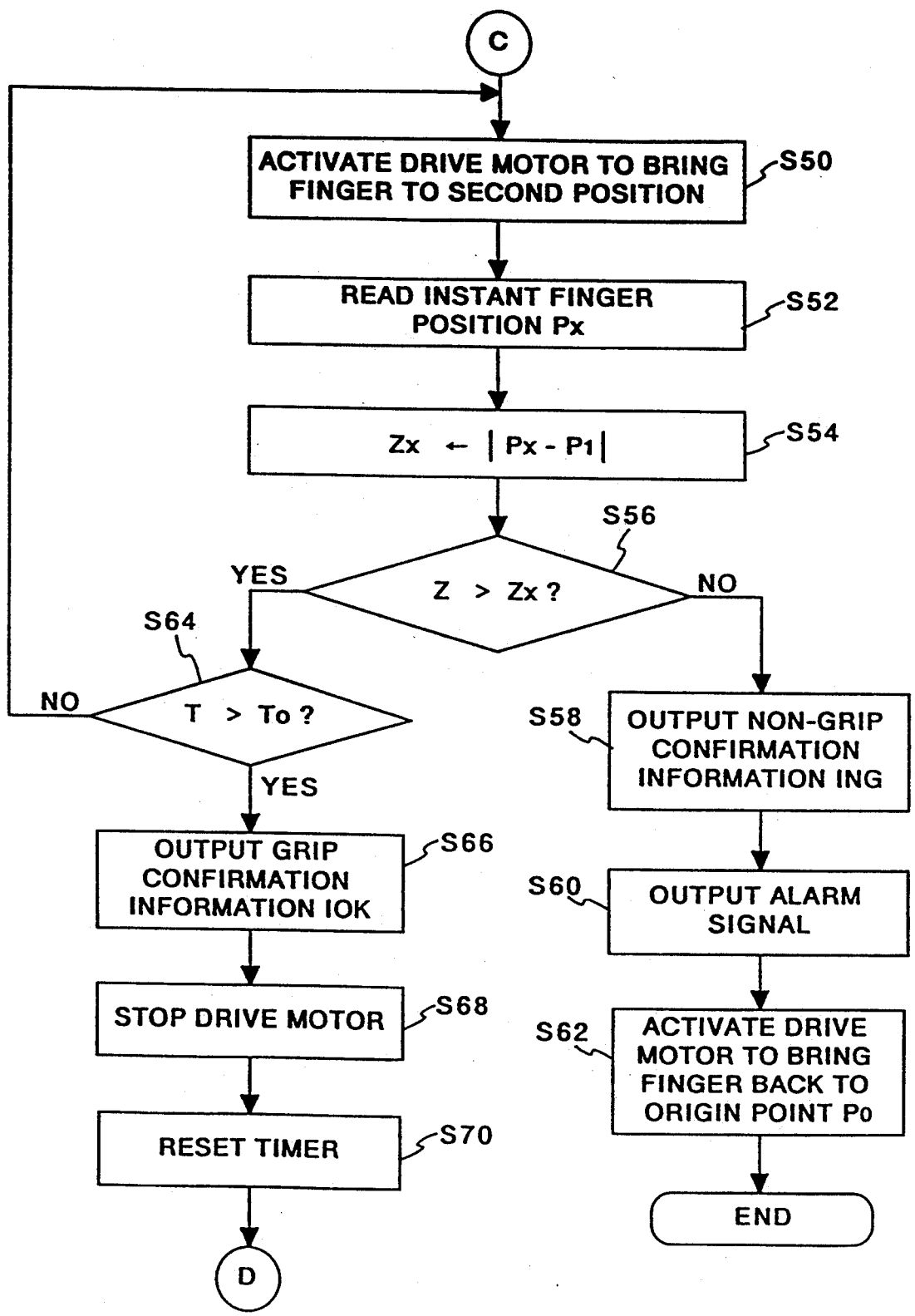
Figure 6:
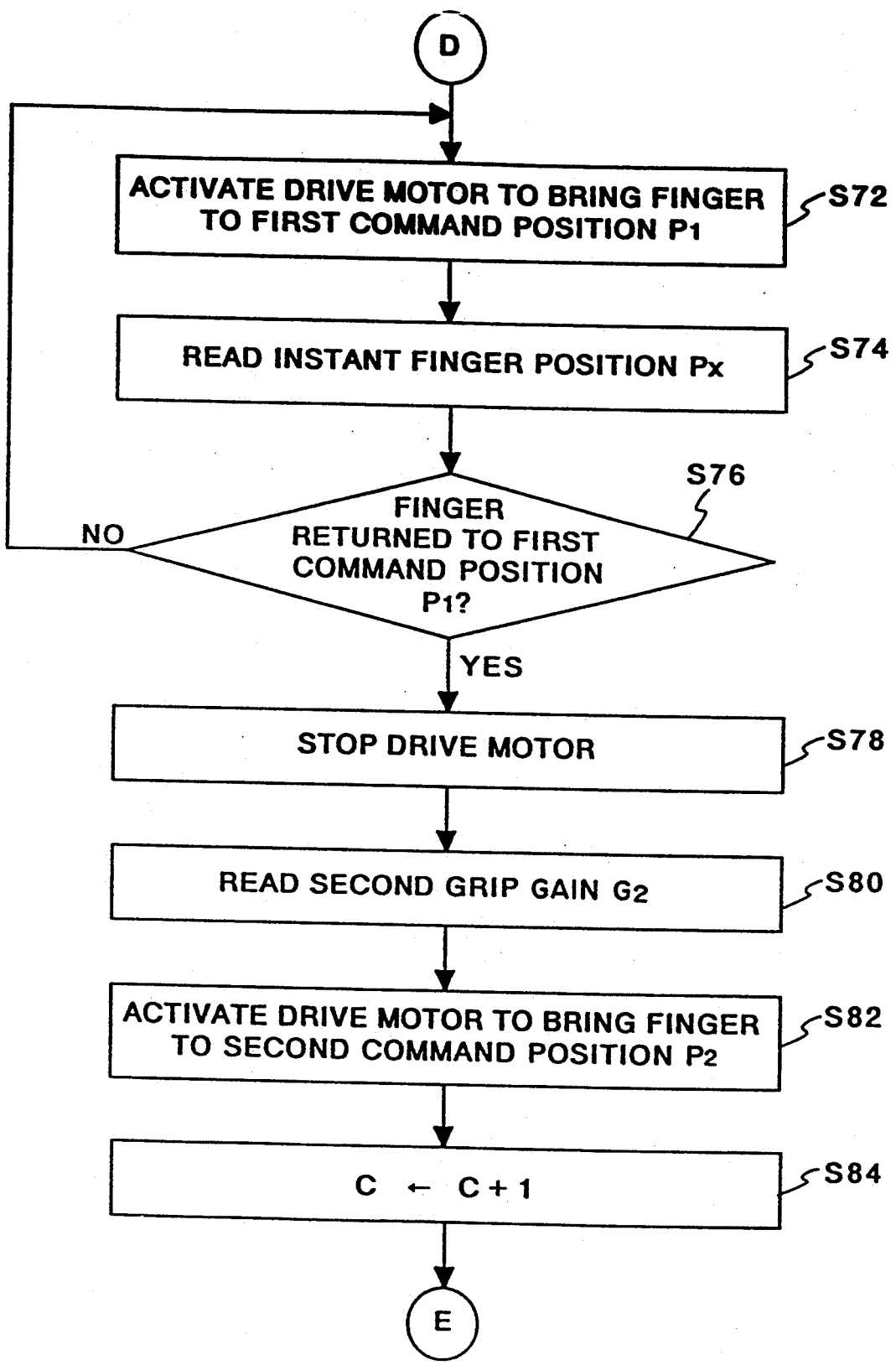
Figure 6:
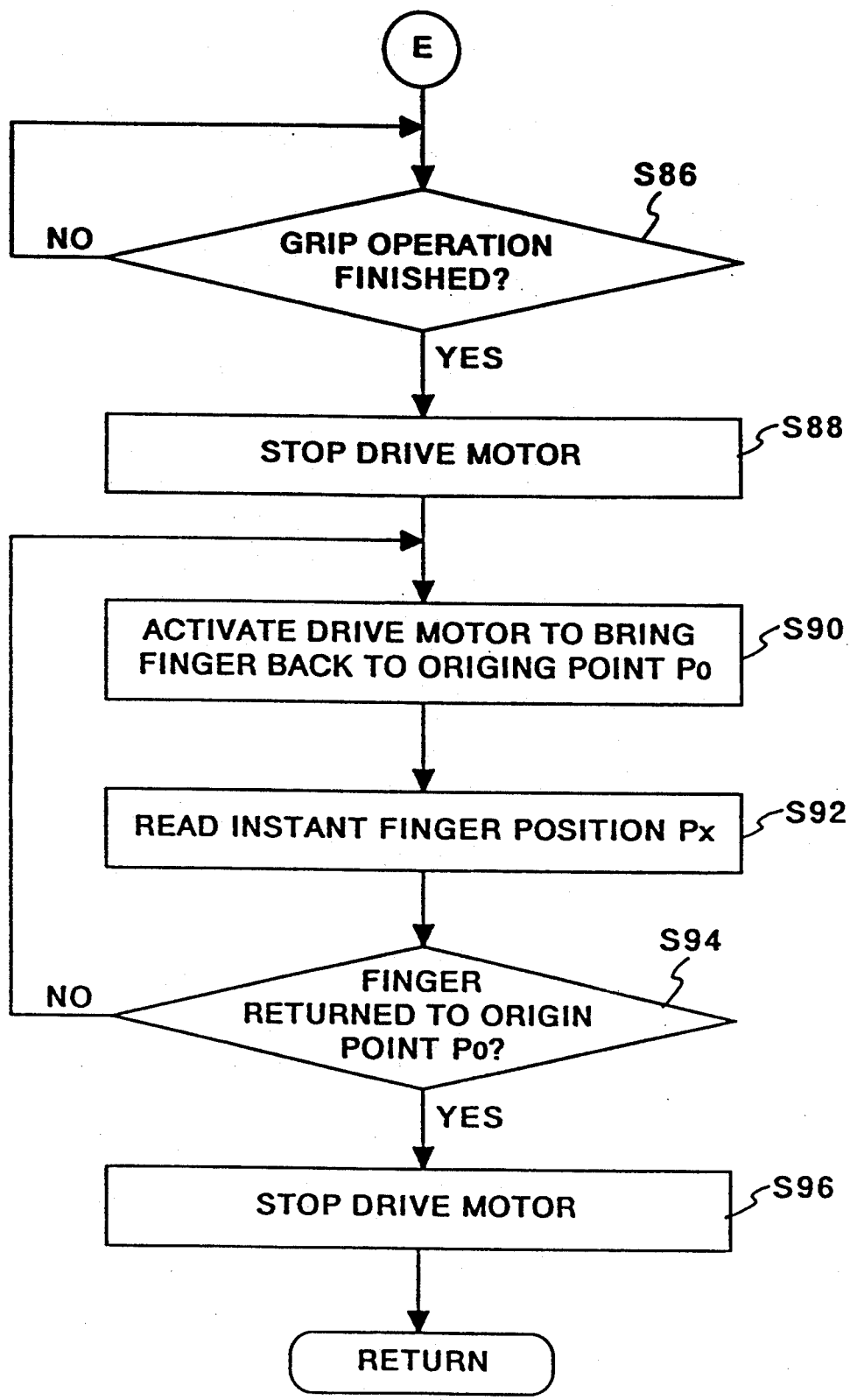

The work clamping control operation performed by the control unit 28 of the work clamping apparatus 10 will be described with reference to a flow chart which is shown partly in FIG. 6 and partly in FIG. 7.

A work W of a predetermined form, which is to be precision-machined by the NC machine, is clamped by the work clamping apparatus 10. In Step S 10, the work W to be clamped is specified. Namely, the values of the data IX and IY concerning the size X of the work W and the elasticity Y of the same are specified. These work size and elasticity data IX and IY are respectively stored in the work size data memory 28A and the work elasticity data memory 28B.

In Step S 12, the first command position setting portion 28D sets the first command position $P_1$ in accordance with the work size data IX stored in the work size data memory 28A. In Step S 14, the second command position setting portion 28E sets the second command position $P_2$ in accordance with the work elasticity data IY stored in the work elasticity data memory 28B and the first command position $P_1$ set in the preceding step S 12 by the first command position setting portion 28D.

In Step S 16, the first clamp gain $G_1$ is set by the first gain setting portion 28F in accordance with the work elasticity data IY stored in the work elasticity data memory 28B. Similarly, in Step S 18, the second clamp gain $G_2$ is set by the first gain setting portion 28G in accordance with the work elasticity data IY stored in the work elasticity data memory 28B.

Step S 20 sets the reference value Z which is used in determining whether the work W is clamped safely by the finger members 18a and 18b, in accordance with the reference data which has been stored in the work reference data memory 28C. In Step 22, the count signal C to be delivered to the counter 28K is reset to "0".

In Step 24, the instant position detecting portion 28I reads the instant position Px of the finger members 18a and 18b in accordance with the rotation data IR delivered by the rotary encoder 22. In Step S 26, whether the instant position Px coincides with the origin position Po is determined. If the answer to the query posed in Step S 26 is NO, i.e., if the finger members 18a, 18b have not turned the origin sensors 30a, 30b on, the process proceeds to Step S 28 in which the drive motor 20 is controlled to reset the finger members 18a, 18b to the positions of origins. The process then proceeds to Step S 30. Conversely, if the answer is YES to the query in step S 26, i.e., when the origin sensors 30a and 30b have been turned on by the finger members 18a, 18b, the process proceeds directly to Step S 30 skipping over Step S 28. The first command position $P_1$ set by the first command position setting portion 28D is read in Step S 30. In Step S 31, the second clamp gain $G_2$ is read from the second gain setting portion 28G. In Step S 32, the drive motor 20 is controlled so as to move the finger members 18a, 18b from the instant position to the first command position $P_1$ at the second gain $G_2$ which is comparatively large. More specifically, the drive motor 20 is controlled so as to rotate the feed screw 24 counterclockwise thereby causing both finger members 18a, 18b to move towards each other and toward the first command position $P_1$ so that the finger members 18a, 18b clamp the work W with the second clamp gain.

In Step 34, the instant position detecting portion 28I reads the instant position Px of the finger members 18a, 18b from the rotation data IR delivered by the rotary encoder 22. Step S 36 determines whether the finger members 18a and 18b have reached the first command position $P_1$.

If the answer to the query posed in Step S 36 is NO, i.e., if the finger members 18a, 18b have not yet reached the first command position $P_1$, the process returns to the aforementioned Step S 32 to repeatedly execute subsequent steps. Conversely, when the answer is YES, i.e., when the arrival of the finger members 18a, 18b at the first command position P$_1$ is confirmed, the process proceeds to Step S 38 in which the drive motor 20 is stopped. As a consequence, the finger members 18a, 18b are temporarily stopped at the first command position P$_1$ as indicated by solid lines in FIG. 3. Thus, the finger members 18a and 18b are stopped in contact with the end surfaces of the work W with a small contact pressure.

Clamping of the work W is commenced by a further inward movement of the finger members 18a, 18b from the first command position P$_1$. In the described embodiment, whether the work W actually exists between both finger members 18a, 18b in a state ready for camping is determined in advance to the start of the clamping operation, by executing the control operation, i.e., without the aid of any sensor.

Namely, in Step S 40, the second command position P$_2$ is read from the second command position setting portion 28E and, in Step S 42, the comparatively small first clamp gain G$_1$ is read from the first clamp gain setting portion 28F. Subsequently, in Step S 44, the reference value Z of the work to be clamped is read from the work reference data memory 28C. In Step S 46, the content of the counter 28K is incremented by "1" and, in Step S 48, the timer 28M is started.

In Step S 50, the drive motor 20 is controlled so as to drive the finger members 18a, 18b towards the second command position P$_2$ which was read in Step S 40. In Step S 52, the instant position detecting portion 28I detects the instant position Px of the finger members 18a, 18b in accordance with the rotation data delivered from the rotary encoder 22. In Step S 54, the amount Zx of travel of the finger members 18a, 18b from the first command position is computed from the difference between the first command position P$_1$ and the instant position of the finger members 18a, 18b read in Step S 52.

Subsequently, Step S 56 determines whether the computed amount Zx of travel of the finger members 18a, 18b is smaller than the work reference value Z read in Step S 44. Thus, whether the work is in position for clamping is detected in this Step S 56.

An answer NO to the query posed in Step S 56 means that the finger members have been moved largely as shown by broken line in FIG. 2 so that the amount Zx of travel of the finger members 18a, 18b from the first command position is greater than the reference value Z peculiar to this work W, i.e., that the work W does not exist between the finger members 18a and 18b. In consequence, clamping failure, i.e., non-clamp state, is detected so that the clamp detecting portion 28J produces the non-clamp signal ING and delivers it to the alarm signal generating portion 28N in Step S 58.

In response to the non-clamp signal ING, the alarm signal generating portion 28N delivers the alarm signal A to the alarm device 36 in Step S 60. Upon receipt of the alarm signal A, the alarm device performs a predetermined alarming operation to inform the operator that the finger members did not clamp the work W. Subsequently, in Step S 62, the drive motor 20 is controlled so as to reset to the finger members 18a, 18b to the origin point Po, thus completing the sequential control operation of the control unit 28.

Conversely, when the work W actually exists between the finger members 18a, 18b, the finger members 18a, 18b are not allowed to move a distance greater than the reference value Z from the first command position P$_1$, since the finger members 18a, 18b are stopped by the clamped work W. In this case, therefore, an answer YES is given in response to the query posed in Step S 56. Actually, however, the measured travel amount Zx may take a smaller value than the real value due to possible delay of response explained before. Therefore, a judgment is conducted in Step S 64 as to whether the time T measured by the timer 28M is longer than a predetermined set time To.

When the time T after the commencement of movement of the finger members from the first command position P1 to the second command position P2 is shorter than the above-mentioned set time To, the process returns to Step 50 to repeat subsequent Steps until the time To elapses. If the travel amount Zx has exceeded the reference value Z in the meantime, an answer NO is given in response to the query posed in Step S 56, thus confirming non-clamping state of the finger members.

Conversely, an answer YES to the query posed in Step S 64 means that the reference value Z has not been exceeded by the measured travel amount Zx even after elapse of the set time To from the start of movement of the finger members 18a, 18b from the first command position P$_1$ towards the second command position P$_2$. In this case, therefore, a safe clamping of the work W is confirmed so that the clamp detecting portion 28J delivers a clamp confirmation signal IOK to the motor drive control portion 28H in Step S 66. Upon receipt of this signal IOK, the motor drive control portion 28H stops the operation of the drive motor 20 in Step S68. In Step S 70, the timer 28M is reset.

After the clamping of the work W has been confirmed as stated above, the following control process is executed to perform clamping of the work W.

In Step S 72, the drive motor 20 is controlled so as to activate the finger members 18a, 18b towards the first command position P$_1$. In Step S 74, the instant position Px of the finger members 18a, 18b is read by the instant position detecting portion 28I on the basis of the rotation data IR derived from the rotary encoder 22. In Step S 76, a judgment is conducted as to whether the finger members 18a, 18b have reached the first command position P$_1$.

If the answer is NO, i.e., if the finger members 18a, 18b have not yet reached the first command position P$_1$, the process returns to Step S 72 to repeat subsequent Steps. Conversely, when the answer YES is given in response to the query in Step S 76, i.e., when arrival of the finger members 18a, 18b at the first command position P$_1$ has been confirmed, the process proceeds to Step S 78 in which the operation of the drive motor 20 is stopped. Consequently, the finger members 18a, 18b are reset to and stationed at the first command position P$_1$.

Then, in Step S 80, the second clamp gain setting portion 28G reads the second clamp gain G$_2$ which is used in the actual clamping operation. In Step S 82, the drive motor 20 is controlled to drive the finger members 18a, 18b towards the second command position P$_2$ at the second clamp gain G$_2$. Consequently, the work W is pressed at both sides by the finger members 18a, 18b strongly with the second clamp gain G$_2$.

The clamping operation is thus started. In Step S 84, the count value C is incremented by "1" so that the count value, which has been incremented by "1" in Step S 46 as described before, is increased to "2".

Step S 86 waits for an instruction for completing the clamping operation. When a clamp completion instruction is received, the operation of the drive motor 20 is stopped in Step S 88. Subsequently, the drive motor 20 is operated so as to actuate the finger members 18a, 18b towards the origin position Po. Subsequently, Step S 92 is executed in which the instant position detecting portion 28I reads the instant position Px of the finger members 18a, 18b in accordance with the rotation data IR from the rotary encoder 22. Step S 94 determines whether the finger members 18a, 18b have reached the origin position Po.

If an answer NO is given in response to the query posed in Step S 94, i.e., when it has been determined that the finger members 18a, 18b have not yet reached the origin position Po, the process returns to Step S 90 to repeatedly execute subsequent steps. Conversely, when the answer is YES, i.e., when the arrival of the finger members 18a, 18b at the origin position Po is confirmed, the process proceeds to Step S 96 to stop the operation of the drive motor 20. Consequently, the finger members 18a, 18b are reset to and stationed at the origin position Po.

The series of control procedures for camping the work W by the clamping apparatus 10 is thus completed, so that the process returns to the initial step.

A description will now be given of the control procedure for enabling the control unit 28 to issue the movement signal M, with specific reference to FIG. 7.

When the actual clamping operation for clamping the work W is commenced in accordance with the series of procedures explained above, it is necessary to enable the moving mechanism 34 of the arm 12 of the NC machine to start an operation for moving the arm 12 to bring the work W to a predetermined position. In the illustrated embodiment, the moving signal M which triggers the movement of the arm 12, is generated in response to the count value C which indicates the number of cycles of operation performed for moving the finger members from the first command position $P_1$ to the second command position $P_2$. More specifically, the movement signal M is generated when the count value C has become "2" which indicates the commencement of the second cycle of operation, i.e., operation for actually clamping the work W.

To explain in more detail, referring to FIG. 7, the movement signal generating portion 28L reads the count value C from the counter 28K in Step S 100. Step S 102 determines whether the count value C has reached "2". If the answer is NO, i.e., if the count value C has not yet been changed to "2", the process returns to Step S 100 in which the operation for reading the count value C is continued.

Conversely, when the count value C has been changed to "2", an answer YES is given in response to the query posed in Step S 102, suggesting that the movement of the finger members 18a, 18b towards the second command position $P_2$ has been started. In this case, therefore, the movement signal M is delivered to the moving mechanism 34 in Step S104. A series of procedures for delivering the movement signal M is thus completed and the control process returns to the initial Step.

As will be understood from the foregoing description, in the described embodiment, no specific control signal is used for generating and delivering the movement signal M for triggering the moving mechanism 34, but the movement signal M is generated in accordance with the result of the counting of the number of cycles of operation of the finger members from the first command position $P_1$ to the second command position $P_2$, i.e., when the count value has reached "2". Thus, whether the instant operation for moving the finger members from the first command position $P_1$ to the second command position $P_2$ is being conducted for the purpose of confirmation of the clamping or for the purpose of actual clamping is discriminated simply by counting the number of cycles of the operation, without using any specific discrimination means.

As will be understood from the foregoing description, in the illustrated embodiment of the present invention, whether the work W has been safely clamped or touched by the work clamping apparatus is detected without using any sensor which is essentially used in known clamping apparatus. Namely, the finger members 18a, 18b are operated with a small clamp gain towards the position of the work. Then, any movement of the finger members 18a, 18b corresponding to the elasticity of the work W is measured. When a movement of an amount within a predetermined amount corresponding to the elasticity of the work is found, it is judged that the work W has been touched by the finger members, i.e., ready for clamping. Conversely, when a movement of a large amount exceeding the above-mentioned predetermined amount is found, it is judged that the work W is not in position for clamping.

In this embodiment when, the movement of the finger members to the first command position $P_1$ is executed with the second clamp gain of a comparatively large value, it is possible to control the position of the finger members with a high degree of precision. In contrast if, the movement of the finger members from the first command position P1 to the second command position P2 is executed with the first clamp gain which is comparatively small, it is possible to confirm whether the work W is in position for clamping, without causing any damage to the work W.

Thus, according to the described embodiment, it becomes possible to detect the state of clamp of the work W, regardless of the shape of the work W, by a slight modification of the control process of an existing control unit 28, without requiring any substantial change of the existing work clamping apparatus and without any aid of a sensor.

In the illustrated embodiment, the second command position $P_2$ is varied in accordance with the work elasticity data IY, in executing the operation for confirming safe clamp of the work W. More specifically, when the elasticity Y of the work W is comparatively small, the second command position $P_2$ is set comparatively close to the first command position $P_1$, whereas, when the work W has a comparatively large elasticity, the second command position $P_2$ is set comparatively far from the first command position $P_1$. Therefore, the drive motor 20 can operate with optimal clamping torque which is determined in accordance with the elasticity of the work W.

In addition, in the described embodiment, the reference value Z used in the actual clamping operation is set for each type of the work W, such that the reference value Z is small for works W having a small elasticity Y and large for works W having a large elasticity. Therefore, the state of clamping is sensed with a high degree of accuracy regardless of whether the elasticity is large or small. Namely, when the work W has a small elasticity Y, i.e., when the work W is hard and rigid, the state of clamping is sensed instantaneously, whereas, when the work W is soft, i.e., when the work has a large elasticity, the state of clamping is sensed with a margin which corresponds to amount of possible elastic deformation of the work W.

Furthermore, in the described embodiment, the safe clamping state is confirmed on conditions that the actual travel amounts Zx of the finger members 18a, 18b is smaller than the reference value Z and that the predetermined time To has passed from the start of the movement of the fingers from the first position $P_1$ for confirming the state of clamp. Thus, whether the work W is in a state for safe clamping is determined taking into account possible delay of response of the force transmission. It is therefore possible to confirm the safe state of clamping without any error which may otherwise be caused by the delay of the response in the force transmission system.

In the described embodiment, the actual clamping operation is not commenced immediately after the conformation of safe clamping of the work W but is conducted after resetting the finger members 18a, 18b to the first command position $P_1$ and then moving again the finger members 18a, 18b towards the second command position $P_2$. Thus, in the described embodiment, the actual clamping is started when the finger members 18a, 18b have been brought again to the first command position $P_1$ where they touch the work W. Thereafter, the clamping force is gradually increased by a progressive movement of the finger members towards the second command position $P_2$, so that the work W can be clamped safely without any damage.

Although a preferred embodiment has been described, it is clear that the described embodiment is only illustrative and various changes and modifications may be imparted thereto without departing from the scope of the present invention.

Figure 4A:
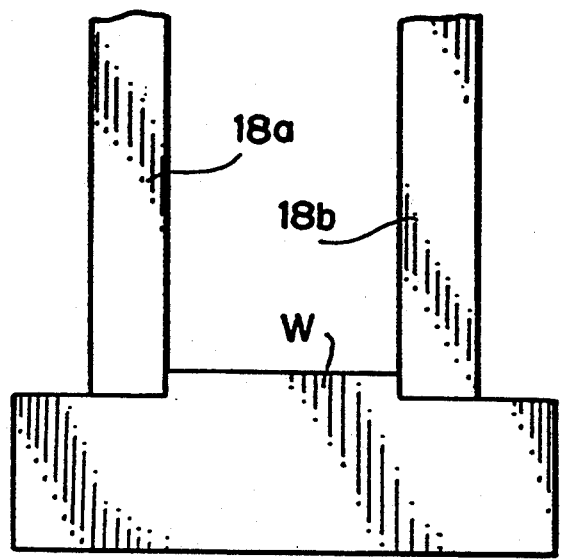
FIG. 4A is a front elevational view of the work clamping apparatus in a state in which it clamps a work.
Figure 4B:
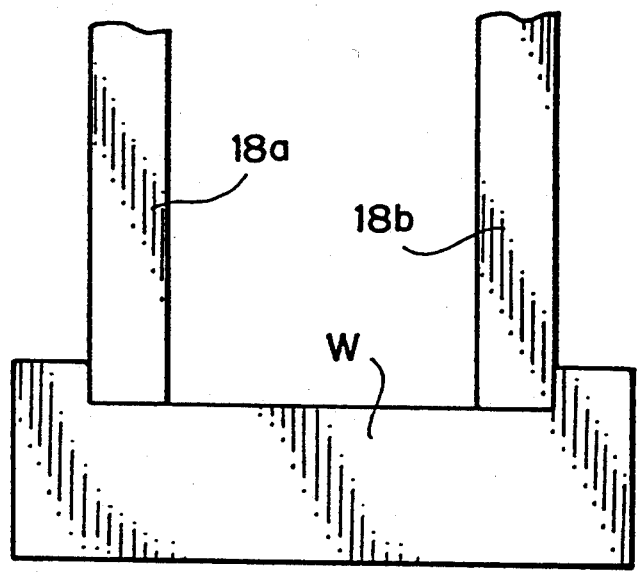
FIG. 4B is a front elevational view of a modification of the embodiment of the work clamping apparatus in a state in which it clamps a different type of work.

For instance, the clamping apparatus may be designed such that the finger members 18a, 18b are adapted to be moved away from each other so as to engage with the inner surfaces of a hollow or recessed work W thereby to hold the work W as shown in FIG. 4B, unlike the embodiment illustrated in FIG. 4A in which the finger members 18a, 18b are adapted to be moved towards each other to pinch or clamp the work W therebetween.

Figure 8:
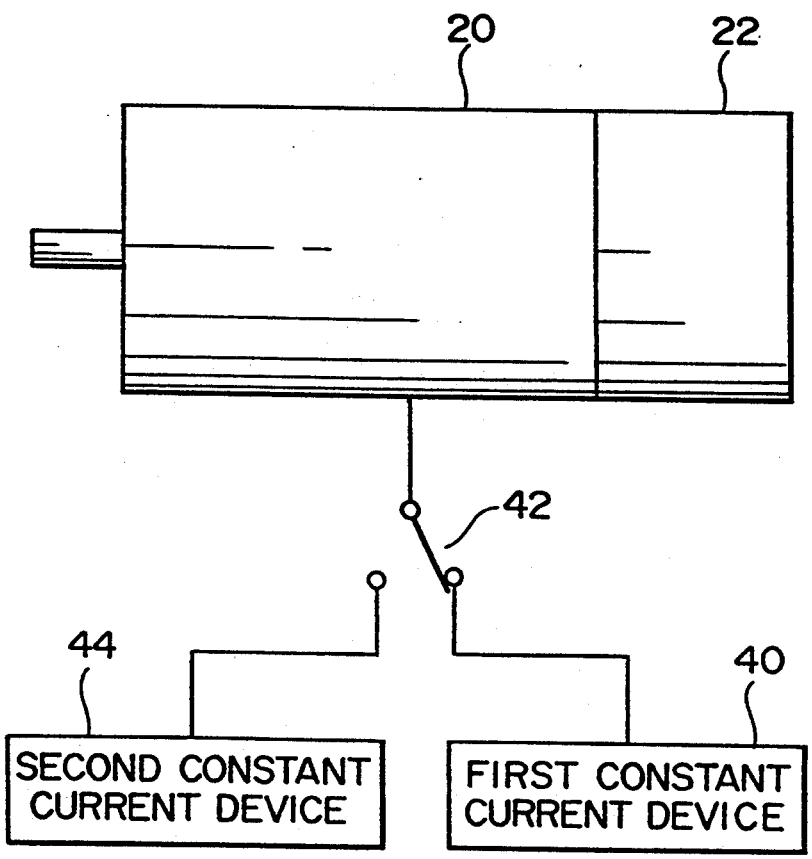
FIG. 8 is a schematic illustration of another embodiment of the work clamping apparatus in accordance with the present invention.

In the actual clamping operation of the described embodiment, the finger members 18a, 18b are moved to the first command position Pl with a comparatively large driving force and, thereafter, the driving force is weakened by the switching of the position control gain to a smaller value. This arrangement, however, is not exclusive, and the control of the driving force can be conducted in a manner which will be explained in connection with FIG. 8 showing another embodiment. Namely, in the embodiment shown in FIG. 8, a first constant current device 40 and a second constant current device 44 are selectively connected to the servo motor 20 through a change-over switch 42. The first constant current device 40 is designed to supply an electric current which is large enough to provide the greater position gain used in the first embodiment, i.e., 2.0 kgcm, while the second current device 44 is designed to produce a small current which is just enough for producing the smaller position gain used in the first embodiment, i.e., 0.4 kgcm.

Thus, in the embodiment shown in FIG. 8, the level of the clamping force exerted by the finger members 18a, 18b is controlled directly by changing the level of the electric current supplied to the drive motor 20, unlike the first embodiment in which the clamping force is controlled by varying the value of the position gain.

As many apparently widely different embodiments of the present invention can be made without departing from the spirit and scope thereof, it is to be understood that the invention is not limited to the specific embodiments thereof except as defined in the appended claims.

What is claimed is:

1. A method of detecting the state of clamping of a workpiece by a pair of finger members of a clamping apparatus, comprising the steps of:
   moving the finger members relative to each other in a clamping direction in accordance with the configuration of the workpiece to a first position where the finger members contact the workpiece with a first force;
   further moving the finger members in the clamping direction toward a second position with a second force smaller than the first force;
   detecting whether any further movement of the finger members toward the second position has been actually effected; and
   determining that the workpiece is in position for actual clamping when substantial further movement of the finger members is not detected in the detecting step and determining that the workpiece is not in the position for clamping when substantial further movement of the finger members is detected in the detecting step.

2. A method of detecting the state of clamping of a workpiece according to claim 1, further comprising the step of signaling an alarm when absence of the workpiece in the position for clamping is determined in the determining step.

3. A method of detecting the state of clamping of a workpiece according to claim 1, further comprising the step of returning the finger members to the first position when presence of the workpiece in the position for clamping is determined in the determining step.

4. A method of detecting the state of clamping of a workpiece according the claim 3, wherein the returning step is followed by the step of causing the finger members to clamp the workpiece with a third force greater that the first force.

5. A method of detecting the state of clamping of a workpiece according to claim 1, wherein the determining step acknowledges substantial further movement of the finger members by determining that the amount of movement of the finger members from the first position toward the second position effected in a predetermined time exceeds a predetermined reference value peculiar to the workpiece to be clamped.

6. A method of detecting the state of clamping of a workpiece according to claim 1, wherein the determining step acknowledges non-occurrence of the substantial further movement of the finger members by determining that the amount of movement of the finger members from the first position toward the second position effected in a predetermined time is not greater than a reference value peculiar to the workpiece to be clamped.

7. An apparatus for confirming clamping of a workpiece, comprising:
   a pair of finger members for clamping the workpiece;

memory means for storing data peculiar to the workpiece to be clamped;

first position setting means for setting, in accordance with data derived from said memory means, a first position of said finger members at a location where said finger members contact the workpiece with a first force;

second position setting means for setting, in accordance with the data derived from said memory means, a second position of said finger members at a location where said finger members engage the workpiece with a second and greater force; and detecting means for detecting whether movement of said finger members from the first position to the second position has occurred, and for determining responsive thereto whether the workpiece is present in a clamping position.

8. An apparatus for confirming clamping of a workpiece according to claim 7, further comprising:

driving means for driving said finger members towards said second position set by said second position setting means from said first position set by said first position setting means.

9. An apparatus for confirming clamping of a workpiece according to claim 8, further comprising reference value memory means for storing reference values which are respectively set for each type of workpiece to be clamped and which are respectively used in the detection of whether movement of said finger members from said first position to said second position occurs relative to a corresponding workpiece.

10. An apparatus for confirming clamping of a workpiece according to claim 9, wherein said detecting means includes:

measuring means for measuring the amount of movement of said finger members from said first position toward said second position and producing movement amount data for a given workpiece; and comparator means for comparing movement amount data produced by said measuring means with said reference value of said given workpiece derived from said reference value memory means and producing an output indication.

11. An apparatus for confirming clamping of a work according to claim 10, wherein said detecting means determines that the given workpiece is absent from said clamping position when said comparator means indicates that the measured amount of movement is greater than said reference value of said given workpiece.

12. An apparatus for confirming clamping of a workpiece according to claim 10, wherein said detecting means further includes time measuring means for measuring the time during which said finger members are moved from said first position toward said second position.

13. An apparatus for confirming clamping of a workpiece according to claim 12, wherein said detecting means determines that the given workpiece is present at said clamping position when said comparator means indicates that the measured amount of movement is smaller than said reference value of said given workpiece and a predetermined time measured by said time measuring means has elapsed.

14. A workpiece clamping method comprising the steps of:

setting parameters relating to a workpiece to be clamped, said setting step including the substeps of:

inputting information regarding the dimensions and elasticity of the workpiece and workpiece reference value information into storage means;

setting, in accordance with a dimensional information of the workpiece, a first target position to which fingers for clamping the workpiece are moved, the fingers when at the first target position being located around a perimeter of the workpiece;

setting, in accordance with the elasticity information of the workpiece, a second target position to which the fingers are moved, the fingers when at the second target position being located inside of the perimeter of the workpiece; and setting a first clamping force of the fingers;

moving the fingers to the first target position;

determining whether or not the workpiece is positioned between the fingers, said determining step including the substeps of:

(i) moving the fingers from the first target position toward the second target position using the first clamping force;

(ii) determining a distance between the first target position and the position of the fingers as they are moved toward the second target position;

(iii) determining that the workpiece is positioned between the fingers if the first clamping force is offset by the rigidity of the workpiece corresponding to the elasticity information thereof whereby the fingers have stopped, and if the determined distance has not exceeded a value in the workpiece reference value information; and (iv) determining that the workpiece is not positioned between the fingers if the fingers have not stopped, and if the determined distance has exceeded said value in the workpiece reference value information; and executing a clamping operation with the fingers if the workpiece is determined to be positioned between the fingers in the determining step, said executing step including the substeps of:

(i) moving the fingers to the first target position;

(ii) setting a second clamping force of the fingers large enough to reliably clamp the workpiece; and (iii) moving the fingers from the first target position toward the second target position using the second clamping force.

15. The method according to claim 14, wherein the distance determining substep including a step of measuring a time period during which the fingers are moved from the first target position toward the second target position, and wherein the substep of determining whether or not the workpiece is positioned between the fingers is performed a predetermined time period after initiation of the movement of the fingers toward the second target position.

16. The method according to claim 15, wherein the predetermined time period is adjusted according to a delayed response of a driving mechanism of the fingers.

* * * * *

UNITED STATES PATENT AND TRADEMARK OFFICE
CERTIFICATE OF CORRECTION

PATENT NO. : 5,293,157
DATED : March 8, 1994
INVENTOR(S) : Yakou

It is certified that error appears in the above-indentified patent and that said Letters Patent is hereby corrected as shown below:

Title Page:
[56] REFERENCES CITED:

FOREIGN PATENT DOCUMENTS, "89451 of 1981 Japan" should read --89451 7/1981 Japan--.

SHEET 11: In the Drawings:

FIG. 6F, "ORIGING" should read --ORIGIN--.

COLUMN 1:

Line 12, "work" should read --work, or workpiece,--.

COLUMN 7:

Line 25, "and" should read --18b--.

COLUMN 9:

Line 5, "data $IC_1$," should read --data $IG_1$,--.

COLUMN 16:

Line 45, "the" (first occurrence) should read --to--.

UNITED STATES PATENT AND TRADEMARK OFFICE
CERTIFICATE OF CORRECTION

PATENT NO. : 5,293,157
DATED : March 8, 1994
INVENTOR(S) : Yakou

It is certified that error appears in the above-indentified patent and that said Letters Patent is hereby corrected as shown below:

COLUMN 18:

Line 8, "a" should read --the--.
Line 52, "including" should read --includes--.

Signed and Sealed this

Twenty-second Day of November, 1994

Attest:

BRUCE LEHMAN

Attesting Officer

Commissioner of Patents and Trademarks